(12) United States Patent
Ma et al.

(10) Patent No.: US 10,714,006 B2
(45) Date of Patent: Jul. 14, 2020

(54) DISPLAY PANEL, METHOD FOR DRIVING THE SAME, AND DISPLAY DEVICE

(71) Applicant: WuHan TianMa Micro-Electronics Co., Ltd., Wuhan (CN)

(72) Inventors: Yangzhao Ma, Wuhan (CN); Tao Peng, Wuhan (CN); Yongzhi Wang, Wuhan (CN)

(73) Assignee: WUHAN TIANMA MICRO-ELECTRONICS CO., LTD, Wuhan (CN)

( * ) Notice: Subject to any disclaimer, the term of this patent is extended or adjusted under 35 U.S.C. 154(b) by 68 days.

(21) Appl. No.: 16/125,819

(22) Filed: Sep. 10, 2018

(65) Prior Publication Data
US 2019/0362667 A1   Nov. 28, 2019

(30) Foreign Application Priority Data

May 23, 2018   (CN) .......................... 2018 1 0502605

(51) Int. Cl.
*G09G 3/3233* (2016.01)
*G06K 9/00* (2006.01)
(Continued)

(52) U.S. Cl.
CPC ......... *G09G 3/3233* (2013.01); *G06K 9/0004* (2013.01); *G06K 9/00006* (2013.01); *G09G 2300/0439* (2013.01); *G09G 2300/0814* (2013.01); *G09G 2320/0233* (2013.01); *G09G 2320/0626* (2013.01)

(58) Field of Classification Search
CPC .................. G09G 3/2003; G09G 3/32; G09G 3/3225–3258; G09G 2300/0439; G09G 2300/0452; G09G 2300/0814; G09G 2320/0233; G09G 2320/043; G09G 2320/0626; G09G 2320/0666;
(Continued)

(56) References Cited

U.S. PATENT DOCUMENTS

2017/0278909 A1*   9/2017   Jeon ...................... A61B 5/1171
2018/0089491 A1*   3/2018   Kim ...................... G02B 6/0088
(Continued)

*Primary Examiner* — David Tung
(74) *Attorney, Agent, or Firm* — Tarolli, Sundheim, Covell & Tummino LLP

(57) ABSTRACT

The present disclosure provides a display panel, a method for driving the display panel and a display device. The display panel includes a plurality of display sub-pixels and a plurality of brightness-enhancement sub-pixels arranged in a display area, some of which are located within a fingerprint identification region in the display area. The display sub-pixel includes first light emission component, first reset module connected to reset signal terminal, first control signal terminal and first light emission component, and first light emission control module connected to power signal terminal, data line, light emission control signal terminal, second control signal terminal, and first light emission component. The brightness-enhancement sub-pixel includes second light emission component and second light emission control module connected to third control signal terminal and second light emission component. The second light emission control module is connected to a respective one first light emission component in one fingerprint identification region.

20 Claims, 9 Drawing Sheets

(51) Int. Cl.
*G09F 9/00* (2006.01)
*G09G 5/10* (2006.01)

(58) Field of Classification Search
CPC .... G09G 2380/08; G09G 5/10; G06K 9/0004; G06K 9/0002; G06K 9/00006; G09F 9/00
See application file for complete search history.

(56) References Cited

U.S. PATENT DOCUMENTS

| | | | |
|---|---|---|---|
| 2018/0096188 A1* | 4/2018 | Xu | G06K 9/00013 |
| 2018/0285619 A1* | 10/2018 | Kim | G09G 3/3208 |
| 2018/0365468 A1* | 12/2018 | Wang | G06F 3/04182 |
| 2019/0095674 A1* | 3/2019 | Ko | H01L 27/3227 |
| 2019/0130155 A1* | 5/2019 | Park | G09G 3/3208 |

\* cited by examiner

DISPLAY PANEL, METHOD FOR DRIVING THE SAME, AND DISPLAY DEVICE

CROSS-REFERENCE TO RELATED APPLICATIONS

The present disclosure claims priority to Chinese Patent Application No. 201810502605.9, filed on May 23, 2018, the content of which is incorporated herein by reference in its entirety.

TECHNICAL FIELD

The present disclosure relates to the field of display technologies, and in particular, to a display panel, a method for driving the display panel, and a display device.

BACKGROUND

For a display panel with a fingerprint recognition function, in order to better achieve a full screen design and prevent a fingerprint recognition region from occupying space of a non-display area, currently, an under-screen fingerprint technology may be used to reuse a display area as the fingerprint recognition region, and take light emitted by sub-pixels in the fingerprint recognition region as light for fingerprint recognition. When performing the fingerprint recognition, the sub-pixels in the fingerprint recognition region are generally required to emit light with a high brightness so as to improve detection accuracy. However, in this way, the sub-pixels in the fingerprint recognition region need to emit light with a high brightness frequently during the fingerprint recognition. This may reduce the service life of the sub-pixels in this region, thereby affecting normal display of the screen and reducing brightness uniformity of display.

SUMMARY

In view of this, embodiments of the present disclosure provide a display panel, a method for driving the display panel, and a display device, which can improve the service life of the sub-pixels in the fingerprint recognition region and improve the brightness uniformity of the display image while improving detection precision of the fingerprint recognition.

In a first aspect, the present disclosure provides a display panel, including a plurality of display sub-pixels and a plurality of brightness-enhancement sub-pixels arranged in a display area. The display area includes a fingerprint identification region, and at least one of the plurality of brightness-enhancement sub-pixels is provided in the fingerprint identification region. Each of the plurality of display sub-pixels includes a first light emission component, a first reset module, and a first light emission control module. In each of the plurality of display sub-pixels, the first reset module is electrically connected to a reset signal terminal, a first control signal terminal, and an anode of the first light emission component, and is configured to reset a signal at the anode of the first light emission component in response to a first control signal. In each of the plurality of display sub-pixels, the first light emission control module is electrically connected to a power signal terminal, a data line, a light emission control signal terminal, a second control signal terminal, and the anode of the first light emission component, and is configured to generate, in response to a second control signal and a light emission control signal, a driving current according to a data signal and a power signal. In the at least one of the plurality of brightness-enhancement sub-pixels located in the fingerprint identification region, each of the at least one of the plurality of brightness-enhancement sub-pixels includes a second light emission component and a second light emission control module. The second light emission control module of each of the at least one of the plurality of brightness-enhancement sub-pixels is electrically connected to the anode of the first light emission component of a respective one of the plurality of display sub-pixels. The second light emission control module of each of the at least one of the plurality of brightness-enhancement sub-pixels is also electrically connected to a third control signal terminal and an anode of the second light emission component, and is configured to, in a fingerprint recognition mode, cause the second light emission component to emit light under the driving current generated by the first light emission control module, in response to a third control signal.

In a second aspect, the present disclosure provides a method for driving a display panel, and the method is applicable to the abovementioned display panel. The display panel has an operating mode including a non-fingerprint recognition mode and a fingerprint recognition mode. In both the non-fingerprint recognition mode and the fingerprint recognition mode, a driving cycle of the display panel includes a reset period and a light emission control period. The method for driving the display panel includes: in the reset period of the non-fingerprint identification mode, resetting, by the first reset module, a signal at the anode of the first light emission component of the display sub-pixel in response to the first control signal; in the light emission control period of the non-fingerprint identification mode, generating, by the first light emission control module, a first driving current according to the first data signal and the power signal in response to the second control signal and the light emission control signal, such that the first light emission component emits light under the first driving current; prohibiting, by the second light emission control module, the second light emission component from emitting light in response to the third control signal; in the reset period of the fingerprint recognition mode, resetting, by the first reset module, the signal at the anode of the first light emission component in response to the first control signal; and in the light emission control period of the fingerprint recognition mode, generating, by the first light emission control module, a second driving current according to the second data signal and the power signal in response to the second control signal and the light emission control signal, such that the first light emission component emits light under the second driving current; and causing, by the second light emission control module in response to the third control signal, the second light emission component to emit light.

In a third aspect, the present disclosure provides a display device including the abovementioned display panel.

BRIEF DESCRIPTION OF DRAWINGS

In order to more clearly illustrate technical solutions in embodiments of the present disclosure, the accompanying drawings used in the embodiments are briefly introduced as follows. Obviously, the drawings described as follows are merely part of the embodiments of the present disclosure, other drawings can also be acquired by those skilled in the art without paying creative efforts.

DESCRIPTION OF EMBODIMENTS

For better illustrating the technical solutions of the present disclosure, embodiments of the present disclosure will be described in detail as follows with reference to the accompanying drawings.

It should be noted that the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association describing associated objects, indicating that there may be three relationships, for example, "A and/or B" indicates three cases, i.e., only A existing, both A and B existing, and only B existing. In addition, the character "/" herein generally indicates that the associated objects form an "or" relationship therebetween.

It should be understood that although light emission control modules may be described using the terms of "first", "second", etc., in the embodiments of the present disclosure, the light emission control modules will not be limited to these terms. These terms are merely used to distinguish the light emission control modules from one another. For example, without departing from the scope of the embodiments of the present disclosure, a first light emission control module may also be referred to as a second light emission control module, and similarly, a second light emission control module may be also referred to as a first light emission control module.

Figure 1:
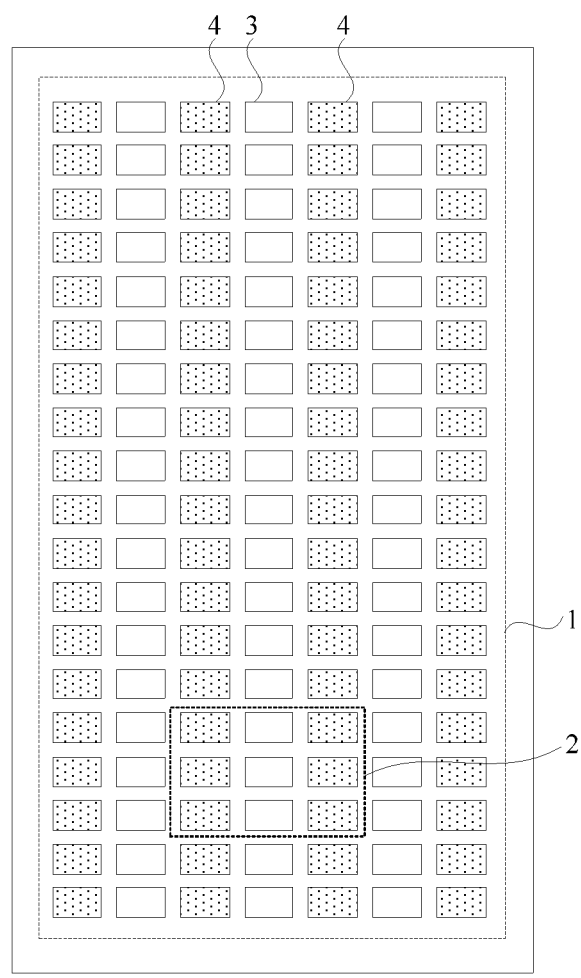
FIG. 1 is a schematic structural diagram of a display panel according to an embodiment of the present disclosure.

An embodiment of the present disclosure provides a display panel. As shown in FIG. 1, which is a schematic structural diagram of a display panel according to an embodiment of the present disclosure, the display panel includes a display area 1, which includes a fingerprint identification region 2. There are display sub-pixels 3 and brightness-enhancement sub-pixels 4 provided in the display area 1. At least some of the brightness-enhancement sub-pixels 4 are disposed in the fingerprint identification region 2.

Figure 2:
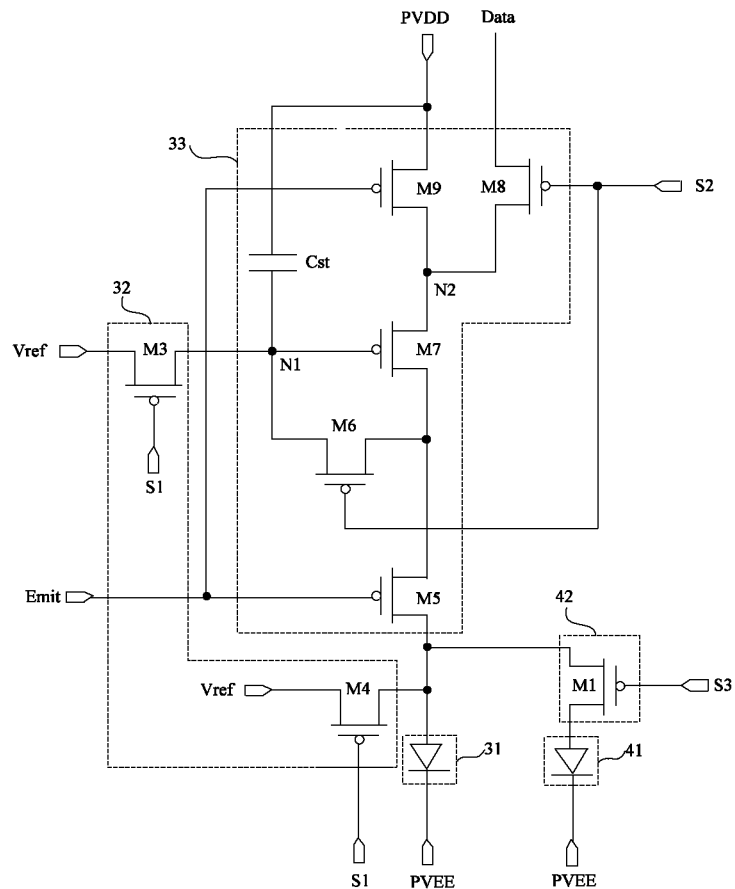
FIG. 2 is a schematic structural diagram of a display sub-pixel and a brightness-enhancement sub-pixel according to an embodiment of the present disclosure.

As shown in FIG. 2, FIG. 2 is a schematic structural diagram of a display sub-pixel and a brightness-enhancement sub-pixel according to an embodiment of the present disclosure. In combination with FIG. 1 and FIG. 2, the display sub-pixel 3 includes a first light emission component 31, a first reset module 32 and a first light emission control module 33. Here, the first reset module 32 is electrically connected to a reset signal terminal Vref, a first control signal terminal S1, and an anode of the first light emission component 31. The first reset module 32 resets a signal at the anode of the first light emission component 31 in response to a first control signal. The first light emission control module 33 is electrically connected to a power signal terminal PVDD, a data line Data, a light emission control signal terminal Emit, a second control signal terminal S2, and the anode of the first light emission component 31. The first light emission control module 33 generates a driving current according to a data signal and a power signal is response to a second control signal and a light emission control signal.

For a brightness-enhancement sub-pixel 4 disposed in the fingerprint identification region 2, the brightness-enhancement sub-pixel 4 includes a second light emission component 41 and a second light emission control module 42. The second light emission control module 42 of each brightness-enhancement sub-pixel 4 is electrically connected to the anode of the first light emission component 31 of a respective one display sub-pixel 3. The second light emission control module 42 is further electrically connected to a third control signal terminal S3 and an anode of the second light emission component 41. In the fingerprint recognition mode, the second light emission control module 42 causes, in response to the third control signal, the second light emission component 41 to emit light under the driving current generated by the first light emission control module 33.

It should be understood that both a cathode of the first light emission component 31 and a cathode of the second light emission component 41 are electrically connected to a signal terminal PVEE so as to achieve normal light emission of the first light emission component 31 and the second light emission component 41.

For one brightness-enhancement sub-pixel 4 and one display sub-pixel 3 that are electrically connected to each other, when the display panel is in a non-fingerprint recognition mode, the first light emission control module 33 of the display sub-pixel 3 generates a driving current according to the data signal and the power signal, the second light emission control module 42 of the brightness-enhancement sub-pixel 4 controls the anode of the second light emission component 41 to be disconnected from the anode of the first light emission component 31 under the action of the third control signal terminal S3, i.e., controlling the anode of the second light emission component 41 to be disconnected from the first light emission control module 33, thereby allowing the driving current to only flow into the first light emission component 31 so that the first light emission component 31 emits light under the driving current. When the display panel is in the fingerprint recognition mode, the first light emission control module 33 generates the driving current according to the data signal and the power signal, and the second light emission control module 42 controls the anode of the second light emission component 41 to be connected to the first light emission control module 33 under the action of the third control signal terminal, thereby allowing the driving current to only flow into both the first light emission component 31 and the second light emission component 41 so that the second light emission component 41 and the first light emission component 31 share the driving current and emit light under the action of their respective driving current.

In addition, it should be noted that, according to the formula L=j×E(j)×AR, where L represents the light emission brightness of the sub-pixel, j represents the current density, E(j) represents the brightness generated by per unit current, and AR represents an aperture ratio of the sub-pixel, when E(j) and AR are constant, the smaller the current density j is, i.e., the smaller the driving current is, the lower the light emission brightness L of the sub-pixel is.

In addition, it should be noted that, according to the formula $$LT95_0 = LT95 \times \left(\frac{j}{j_0}\right)^n,$$

where n represents the acceleration attenuation coefficient, $J_0$ represents the quantitative current density, $LT95_0$ represents the time required for the 255 grayscale brightness to be attenuated to 95% under a condition that the current density is $J_0$. It can be seen that when $J_0$ and $LT95_0$ are constant, the smaller the current density j is, the longer the time required for the 255 grayscale brightness to be attenuated to 95% is, that is, the smaller the driving current is, the longer service life the sub-pixel has. Further, the lower the light emission brightness L of the sub-pixel is, the longer service life the sub-pixel has.

Based on the above analysis, for the display panel provided by the present disclosure, the brightness-enhancement sub-pixels 4 are provided in the fingerprint identification region 2, and the second light emission control module 42 of each brightness-enhancement sub-pixel 4 in the fingerprint identification region 2 is electrically connected to the first light emission component 31 of a respective one display sub-pixel 3. In such a way, when the display panel is in the fingerprint recognition mode, compared with the related art in which that the brightness required for the fingerprint recognition is achieved only by enhancing the light brightness of the display sub-pixel 3, this embodiment of the present disclosure drives the brightness-enhancement sub-pixel 4 to emit light, so that the brightness-enhancement sub-pixel 4 and the display sub-pixel 3 share the brightness required for the fingerprint recognition, thereby improving the overall brightness in the fingerprint identification region 2. That is, this can improve the fingerprint recognition detection accuracy without additionally increasing or decreasing the light brightness of the display sub-pixel 3 in the fingerprint identification region 2 during the fingerprint identification process, thereby improving the service life of these sub-pixels 3 and effectively improving the brightness uniformity of the image displayed on the display panel.

In addition, it should be noted it is merely illustrative in FIG. 1 that a part of the display area 1 is used as the fingerprint identification region 2. In other embodiments of the present disclosure, the entire display area 1 can be reused as the fingerprint identification region 2.

The principle of improving the service life of the display sub-pixel 3 in the fingerprint identification region 2 will be described in detail by taking the following three manners as examples.

First Manner:

The second light emission control module 42 of the brightness-enhancement sub-pixel 4 is electrically connected to the anode of the first light emission component 31 of the display sub-pixel 3 in the fingerprint identification region 2. For the brightness-enhancement sub-pixel 4 and the display sub-pixel 3 that are connected to each other, a color of the light emitted from the brightness-enhancement sub-pixel 4 is the same as a color of the light emitted from the display sub-pixel 3. In an example, both the brightness-enhancement sub-pixel 4 and the display sub-pixel 3 emit red light, or blue light, or green light.

In the non-fingerprint identification mode, the data line Data provides a first data signal with a voltage value of V1, and the first light emission control module 33 of the display sub-pixel 3 generates a first driving current with a current value of I1 according to the first data signal and the power signal, so that the first light emission component 31 emits light under the action of the first driving current.

In the fingerprint recognition mode, in order to improve the fingerprint recognition detection accuracy, the data line Data provides a second data signal with a voltage value of V2, where V2>V1. The first light emission control module 33 of the display sub-pixel 3 generates a second driving current with a current value of I2 according to the second data signal and the power signal, where I2>I1. At the same time, the second light emission control module 42 of the brightness-enhancement sub-pixel 4 controls the second light emission component 41 to be connected to the first light emission control module 33 under the action of the third control signal. Then, the second light emission component 41 and the first light emission component 31 share the second driving current, so that the second light emission component 41 and the first light emission component 31 simultaneously emit light under their respective driving current. At this time, the total light brightness of the second light emission component 41 and the first light emission component 31 is equal to the light brightness of one light emission component under the action of the second driving current.

In this embodiment of the present disclosure, taking I2=2I1 as an example, making the second light emission component 41 and the first light emission component 31 share the second driving current can allow the current value of the driving current actually got by the first light emission component 31 to approach I1. Therefore, in the fingerprint recognition mode, the light brightness of the display sub-pixel 3 in the fingerprint identification region 2 approaches its light brightness in the non-fingerprint recognition mode. It can be seen that, compared with the related art in which that the second driving current is taken only by the first light emission component, this embodiment of the present disclosure provides the brightness-enhancement sub-pixel 4, so as to decrease the light brightness of the display sub-pixel 3 in the fingerprint identification region 2 while improving the fingerprint recognition detection accuracy, thereby improving the service life of these sub-pixels 3.

In an implementation, in order to allow the display panel to achieve normal image display, it may be set as 0.025 nA<I1<0.08 nA. In order to allow the display panel to provide a sufficient brightness for accurate fingerprint recognition in the fingerprint recognition mode, it may be set as that I2≥2I1.

Second Manner:

The second light emission control module 42 of the brightness-enhancement sub-pixel 4 is electrically connected to the anode of the first light emission component 31 of the display sub-pixel 3 disposed in the fingerprint identification region 2. For the brightness-enhancement sub-pixel 4 and the display sub-pixel 3 that are connected to each other, the light emitted from the display sub-pixel 3 has a first color, the light emitted from the brightness-enhancement sub-pixel 4 has a second color, and a contribution value of the second color to the brightness is greater than a contribution value of the first color to the brightness. In an example, the display sub-pixel 3 emits red light, and the brightness-enhancement sub-pixel 4 emits green light.

In the non-fingerprint identification mode, the data line Data provides a first data signal with a voltage value of V1, and the first light emission control module 33 of the display sub-pixel 3 generates a first driving current value with a current value of I1 according to the first data signal and the power signal, so that the first light emission component 31 emits light under the action of the first driving current.

In the fingerprint recognition mode, in order to improve the fingerprint recognition detection accuracy, the data line Data provides a second data signal with a voltage value of V2. The first light emission control module 33 of the display sub-pixel 3 generates a second driving current with a current value of I2 according to the second data signal and the power signal. At the same time, the second light emission control module 42 of the brightness-enhancement sub-pixel 4 controls the second light emission component 41 to be connected to the first light emission control module 33 under the action of the third control signal, and then the second light emission component 41 and the first light emission component 31 share the second driving current so that the second light emission component 41 and the first light emission component 31 simultaneously emit light under their respective driving current.

However, since the contribution value of the second color to the brightness is greater than the contribution value of the first color to the brightness, that is, in the case that the driving current received by the brightness-enhancement sub-pixel 4 has a same value as the driving current received by the display sub-pixel 3, the brightness presented the brightness-enhancement sub-pixel 4 is higher than the brightness presented the display sub-pixel 3. In an example, the brightness-enhancement sub-pixel 4 is a green sub-pixel, and the display sub-pixel 3 connected thereto is a red sub-pixel or a blue sub-pixel. The red sub-pixel has a luminous efficiency within a range of 40 lm/w to 50 lm/W, the blue sub-pixel has a luminous efficiency within a range of 4.5 lm/W to 6 lm/W, and the green sub-pixel has a luminous efficiency within a range of 100 lm/W to 120 lm/W. Therefore, when the red sub-pixel, the blue sub-pixel, and the green sub-pixel are provided with a driving current of 46 mA, the light brightness of the red sub-pixel is 110 nit, the light brightness of the blue sub-pixel is 35 nit, and the light brightness of the green sub-pixel is 288 nit. It can be known that the contribution value of the green sub-pixel to the brightness is much greater than that of the red sub-pixel and the blue sub-pixel when a same driving current is applied to the sub-pixels with the three colors.

In view of this, the driving current value, which allows the brightness-enhancement sub-pixel 4 and the display sub-pixel 3 to achieve the power brightness required for the brightness recognition accuracy, can be smaller. V2 can be smaller than or equal to V1.

In an implementation, taking V2=V1 as an example, in the fingerprint recognition mode, the current value of the second driving current generated by the first light emission control module 33 is I1, and the second light emission component 41 and the first light emission component 31 share the second driving current, so that both the current value of the driving current taken by the first light emission component 31 and the current value of the driving current taken by the second light emission component 41 approach to $$\frac{I1}{2}.$$

At this time, the light brightness of the first light emission component 31 corresponds to the light brightness corresponding to the driving current with a current value of $$\frac{I1}{2},$$

and the light brightness of the second light emission component 41 is higher than the light brightness corresponding to the driving current with a current value of $$\frac{I1}{2}.$$

Therefore, the total brightness of the first light emission component 31 and the second light emission component 41 is larger than the light brightness of the first light emission component 31 corresponding to the driving current with a current value of I1. That is, even if I2=I1, the total brightness presented the display sub-pixel 3 and the brightness-enhancement sub-pixel 4 in the fingerprint recognition mode is larger than that of the display sub-pixel 3 in the non-fingerprint identification mode, so that the light brightness of the fingerprint identification region 2 in the fingerprint recognition mode can be improved. It can be seen that this can decrease the light brightness of the display sub-pixel 3 in the fingerprint identification region 2 while improving the fingerprint recognition detection accuracy, thereby increasing the service life of the display sub-pixel 3.

In an implementation, I2 can be larger than or smaller than I1. The specific value of I2 can be defined according to the actual demand for the overall light brightness of the fingerprint identification region 2 in the fingerprint recognition mode.

Third Manner:

When the display area 1 further includes a non-fingerprint identification region, the second light emission control module 42 of the brightness-enhancement sub-pixel 4 is electrically connected to the anode of the first light emission component 31 of the display sub-pixel 3 disposed in the non-fingerprint identification region.

For the display sub-pixel 3 in the fingerprint identification region 2, in the non-fingerprint identification mode, the data line Data provides a first data signal with a voltage value of V1, and the first light emission control module 33 of the display sub-pixel 3 generates a first driving current according to the first data signal and the power signal, so that the first light emission component 31 emits light under the action of the first driving current.

In the fingerprint recognition mode, the data line Data provides a second data signal with a voltage value of V2, and the first light emission control module 33 of the display sub-pixel 3 generates a second driving current according to the second data signal and the power signal, so that the first light emission component 31 emits light under the action of the second driving current. At the same time, the brightness-enhancement sub-pixel 4 emits light under the action of the driving current generated by the first light emission control module 33 connected to the brightness-enhancement sub-pixel 4. Therefore, the display sub-pixel 3 in the fingerprint identification region 2 and the brightness-enhancement sub-pixel 4 share the brightness required for the fingerprint identification. In this case, when the display panel is in the fingerprint recognition mode, there is no need to increase or decrease the brightness of the display sub-pixel 3 in the fingerprint identification region 2, and the brightness-enhancement sub-pixel 4 can be used to improve the overall brightness of the fingerprint identification region 2. In an implementation, the brightness presented by the display sub-pixel 3 in the fingerprint identification region 2 in the fingerprint recognition mode is the same as the brightness presented in the non-fingerprint recognition mode. In this case, V2=V1. Alternatively, the brightness presented by the display sub-pixel 3 in the fingerprint identification region 2 in the fingerprint recognition mode is smaller than the brightness presented in the non-fingerprint recognition mode. In this case, V2<V1. It can be seen that in this manner, the service time of the display sub-pixel 3 in the fingerprint identification region 2 can be improved.

In an implementation, with further reference to FIG. 2, the second light emission control module 42 includes a first thin film transistor M1. The first thin film transistor M1 includes a control electrode electrically connected to the third control signal terminal S3, a first electrode electrically connected to the anode of the first light emission component 31, and a second electrode electrically connected to the anode of the second light emission component 41. The first thin film transistor M1 controls connection/disconnection between the anode of the second light emission component 41 and the anode of the first light emission component 31 in response to the third control signal.

It should be noted that the structures of the first reset module 32 and the first light emission control module 33 of the display sub-pixel 3 are the same as those of the reset module and the light emission control module in the pixel circuit of the sub-pixel in the related art. In the following, with reference to FIG. 2 and by using the structures of the first reset module 32 and the second reset module 43 shown in FIG. 2 as an example, the operating principle of the display sub-pixel 3 and the brightness-enhancement sub-pixel 4 in the fingerprint identification region 2 will be described in detail.

With further reference to FIG. 2, the first reset module 32 of the display sub-pixel 3 includes a third thin film transistor M3 and a fourth thin film transistor M4. The third thin film transistor M3 includes a control electrode electrically connected to the first control signal terminal S1, a first electrode electrically connected to the reset signal terminal Vref, and a second electrode electrically connected to a first node N1. The fourth thin film transistor M4 includes a control electrode electrically connected to the first control signal terminal S1, a first electrode electrically connected to the reset signal terminal Vref, and a second electrode electrically connected to the anode of the first light emission component 31.

The first light emission control module 33 includes the fifth to the ninth thin film transistors M5 to M9, and a storage capacitor Cst. The fifth thin film transistor M5 includes a control electrode electrically connected to the light emission control signal terminal Emit, a first electrode electrically connected to a second electrode of the sixth thin film transistor M6, and a second electrode electrically connected to the anode of the first light emission component 31. The sixth thin film transistor M6 includes a control electrode electrically connected to the second control signal terminal S2, and a first electrode electrically connected to the first node N1. The seventh thin film transistor M7 includes a control electrode electrically connected to the first node N1, a first electrode electrically connected to the second electrode of the ninth thin film transistor M9, and a second electrode electrically connected to the first electrode of the fifth thin film transistor M5. The eighth thin film transistor M8 includes a control electrode electrically connected to the second control signal terminal S2, a first electrode electrically connected to the data line Data, and a second electrode electrically connected to the first electrode of the seventh thin film transistor M7. The ninth thin film transistor M9 includes a control electrode electrically connected to the light emission control signal terminal Emit, and a first electrode electrically connected to the power signal terminal PVDD. The storage capacitor Cst includes a first polar plate electrically connected to the power signal terminal PVDD, and a second polar plate electrically connected to the first node N1.

The first thin film transistor M1 to the ninth thin film transistor M9 can be P-type thin film transistors, each of which has one control terminal (a gate electrode) and two connection terminals (a source electrode and a drain electrode). The two connection terminals can be controlled to be disconnected from one another when the control terminal obtains a high-level signal, and the two connection terminals can be controlled to be connected to each other when the control terminal obtains a low-level signal.

The operating modes of the display panel include a non-fingerprint recognition mode and a fingerprint recognition mode. In both the non-fingerprint recognition mode and the fingerprint recognition mode, the display panel has a driving cycle including a reset period and a light emission control period. The light emission control period includes a data signal writing period and a light emission period.

Figure 3:
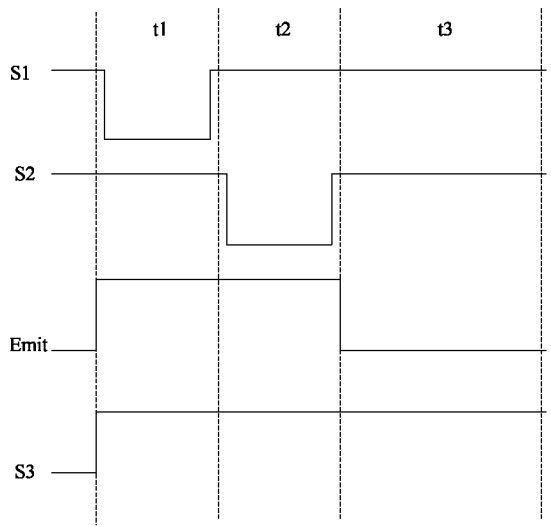
FIG. 3 is a signal sequence diagram corresponding to a case in which a display panel is in a non-fingerprint recognition mode according to an embodiment of the present disclosure.

When the display panel is in the non-fingerprint recognition mode, as shown in FIG. 3, which is a signal sequence diagram corresponding to a case in which the display panel is in a non-fingerprint recognition mode according to an embodiment of the present disclosure, in the reset period t1, the first control signal is at a low-level, the second control signal is at a high-level, the light emission control signal is at a high-level, and the third control signal is at a high-level. The third thin film transistor M3 and the fourth thin film transistor M4 are switched on under the low-level of the first control signal, and the first node N1 and the anode of the first light emission component 3 are reset by using the reset signal.

In the data signal writing period t2, the first control signal is at a high-level, the second control signal is at a low-level, the light emission control signal is at a high-level, and the third control signal is at a high-level. The seventh thin film transistor M7 is switched on under the low-level of the first node N1, and the eighth thin film transistor M8 and the sixth thin film transistor M6 are switched on under the low-level of the second control signal, such that the first data signal provided by the data line Data is written into the second node N2.

In the light emission period t3, the first control signal is at a high-level, the second control signal is at a high-level, the light emission control signal is at a low-level, and the third control signal is at a high-level. The fifth thin film transistor M5 and the ninth thin film transistor M9 are switched on under the low-level of the light emission control signal, and the seventh thin film transistor M7 is kept on under the low-level of the first node N1. The first light emission component 31 emits light under the action of the first driving current generated based on the power signal and the first data signal.

Figure 4:
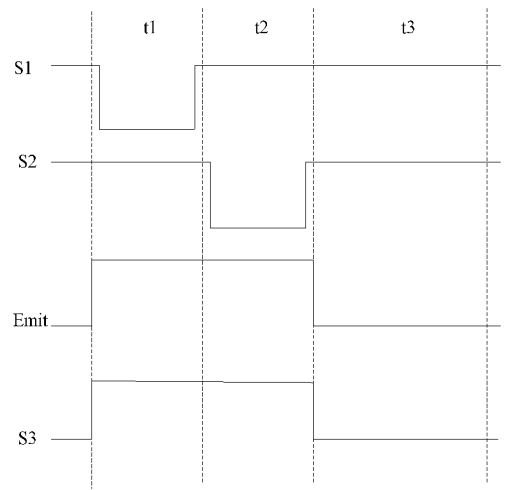
FIG. 4 is a signal sequence corresponding to a case in which a display panel is in a fingerprint recognition mode according to an embodiment of the present disclosure.

When the display panel is in the fingerprint recognition mode, as shown in FIG. 4, which is a signal sequence diagram corresponding to a case in which the display panel is in the fingerprint recognition mode according to an embodiment of the present disclosure, in the reset period t1, the first control signal is at a low-level, the second control signal is at a high-level, the light emission control signal is at a high-level, and the third control signal is at a high-level. The third thin film transistor M3 and the fourth thin film transistor M4 are switched on under the low-level of the first control signal, such that the first node N1 and the anode of the first light emission component 31 are reset by using the reset signal.

In the data signal writing period t2, the first control signal is at a high-level, the second control signal is at a low-level, the light emission control signal is at a high-level, and the third control signal is at a high-level. The seventh thin film transistor M7 is switched on under the low-level of the first node N1, and the eighth thin film transistor M8 and the sixth thin film transistor M6 are switched on under the low-level of the second control signal, such that the second data signal provided by the data line Data is written into the second node N2.

In the light emission period t3, the first control signal is at high-level, the second control signal is at high-level, the light emission control signal is at a low-level, and the third control signal is at a low-level. The first thin film transistor M1 is switched on under the low-level of the third control signal. The fifth thin film transistor M5 and the ninth thin film transistor M9 are switched on under the low-level of the light emission control signal. The seventh thin film transistor M7 is kept on state under the low-level of the first node N1. The first light emission component 31 and the second light emission component 41 emit light at the same time under the action of the second driving current generated based on the power signal and the second data signal.

Figure 5:
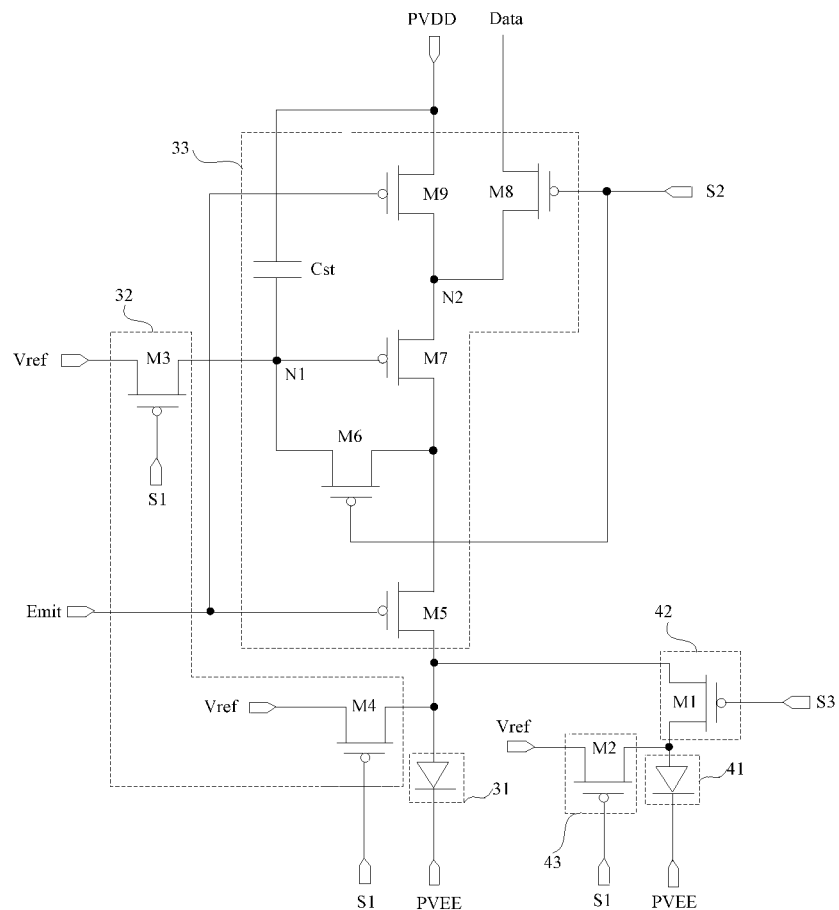
FIG. 5 is another schematic structural diagram of a display sub-pixel and a brightness-enhancement sub-pixel according to an embodiment of the present disclosure.

Further, as shown in FIG. 5, which is another schematic structural diagram of a display sub-pixel and a brightness-enhancement sub-pixel according to an embodiment of the present disclosure, the brightness-enhancement sub-pixel 4 can further include a second reset module 43. The second reset module 43 is electrically connected to the reset signal terminal Vref, the first control signal terminal S1 and the anode of the second light emission component 41. The second reset module 43 resets a signal at the anode of the second light emission component 41 in response to the first control signal.

The brightness-enhancement sub-pixel 4 includes a second reset module 43. When the display panel is in the fingerprint recognition mode, in the reset period t1, the second reset module 43 operates under the first control signal, the anode of the second light emission component 41 is reset using the rest signal, and the potential of the anode of the second light emission component 41 can be restored to the initial potential, so as to achieve normal light emission of the second light emission component 41 in the subsequent light emission control period.

With further reference to FIG. 5, the second reset module 43 includes a second thin film transistor M2. The second thin film transistor M2 includes a control electrode electrically connected to the first control signal terminal S1, a first electrode electrically connected to the reset signal terminal Vref, and a second electrode electrically connected to the anode of the second light emission component 41. The second thin film transistor M2 achieves an electrical connection between the reset signal terminal Vref and the anode of the second light emission component 41 in response to the first control signal.

In an implementation, the second light emission control module 42 of each brightness-enhancement sub-pixel 4 is electrically connected to the anode of the first light emission component 31 of the display sub-pixel 3 adjacent to the brightness-enhancement sub-pixel 4. With this connection manner, a wiring length for connecting the second light emission control module 42 to the first light emission component 31 decreases, thereby reducing the space occupied by this wiring in the display area 1 and thus preventing the wiring from influencing the aperture ratio of the sub-pixel.

Figure 6:
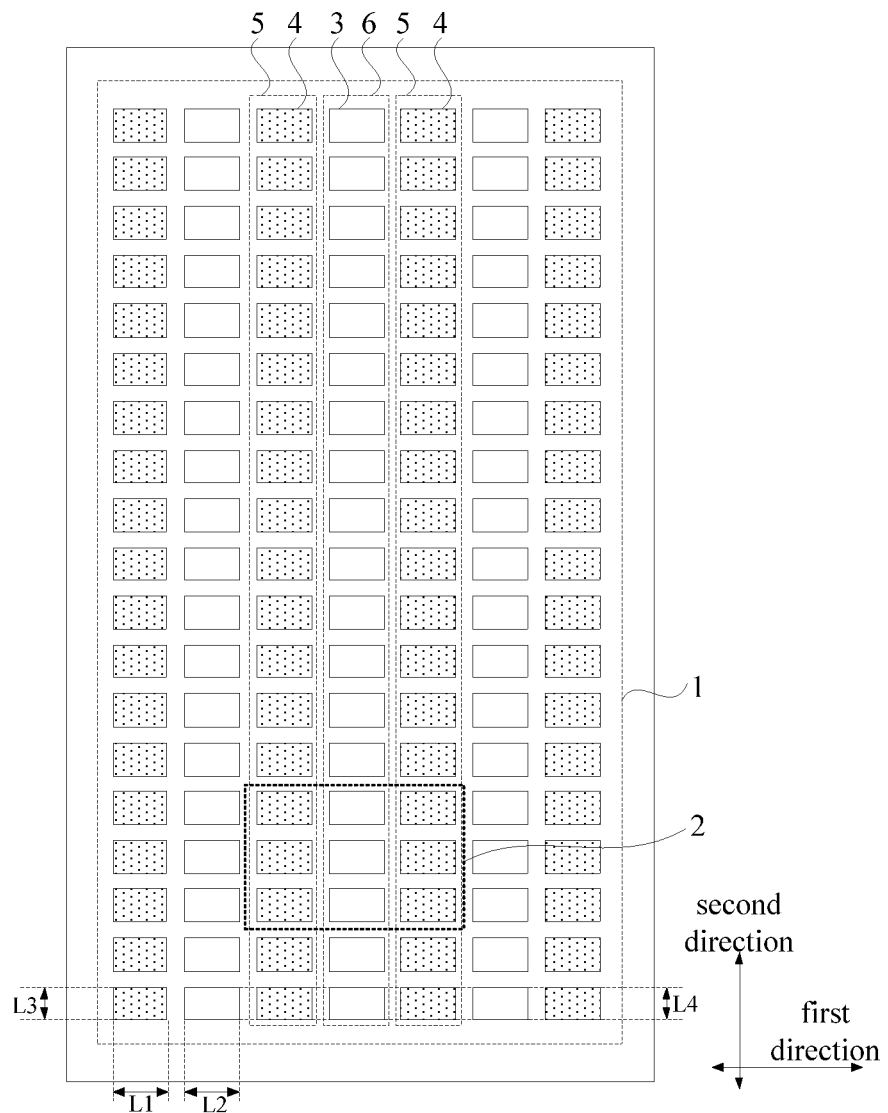
FIG. 6 is a schematic diagram of an arrangement of brightness-enhancement sub-pixels and display sub-pixels according to an embodiment of the present disclosure.

In an implementation, as shown in FIG. 6, which is a schematic diagram of an arrangement of brightness-enhancement sub-pixels and display sub-pixels according to an embodiment of the present disclosure, the display panel includes a plurality of brightness-enhancement sub-pixel units 5 and a plurality of display sub-pixel units 6. Each brightness-enhancement sub-pixel unit 5 includes a plurality of brightness-enhancement sub-pixels 4 arranged along a second direction, and each display sub-pixel unit 6 includes a plurality of display sub-pixels 3 arranged in the second direction. At least one display sub-pixel unit 6 is arranged between two adjacent brightness-enhancement sub-pixel units 5.

It should be understood that there are various manners for providing the brightness-enhancement sub-pixel 4 in the display area 1. One manner is to enlarge the area of the display area 1 so as to provide the space for the brightness-enhancement sub-pixel 4, and another manner is to reduce the length of the display sub-pixel 3 in the first direction without changing the area of the display area 1 so as to reduce the space occupied by the display sub-pixel 3 in the display area 1 and thus provide the space for the brightness-enhancement sub-pixel 4.

In addition, it should be noted that the number of brightness-enhancement sub-pixels 4 included in the brightness-enhancement sub-pixel unit 5 may be or may not be equal to the number of display sub-pixels 3 included in the display sub-pixel unit 6. In an example, a part of the display area 1 is reused as the fingerprint identification region 2. In this example, with reference to FIG. 6, the number of brightness-enhancement sub-pixels 4 included in each brightness-enhancement sub-pixel unit 5 may be equal to the number of display sub-pixels 3 included in each display sub-pixel unit 6. In this case, a part of the brightness-enhancement sub-pixels 4 is located in the finger print identification region 2.

Figure 7:
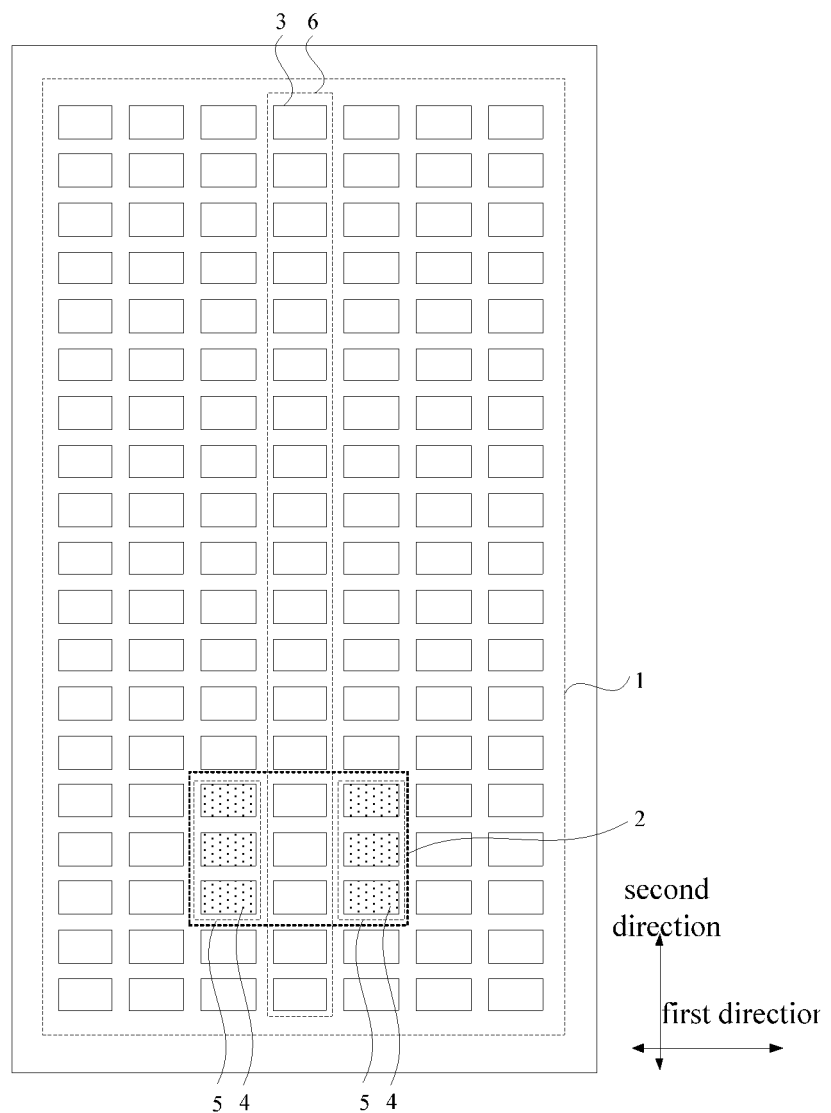
FIG. 7 is a schematic diagram of another arrangement of brightness-enhancement sub-pixels and display sub-pixels according to an embodiment of the present disclosure.

In another embodiment, as shown in FIG. 7, which is a schematic diagram of another arrangement of brightness-enhancement sub-pixels and display sub-pixels according to an embodiment of the present disclosure, the number of brightness-enhancement sub-pixel 4 included in the brightness-enhancement sub-pixel unit 5 is smaller than the number of display sub-pixels 3 included in the display sub-pixel unit 6. In this case, all the brightness-enhancement sub-pixels 4 are located within the fingerprint identification region 2.

In an implementation, when a part of the brightness-enhancement sub-pixels 4 is located within the fingerprint identification region 2, in order to achieve that the fingerprint identification region 2 can emit light with a sufficient brightness in the fingerprint recognition mode and that the service life of the display sub-pixel 3 in the fingerprint identification region 2 can be effectively improved, a ratio K of the number of brightness-enhancement sub-pixels 4 in the fingerprint identification region 2 to the number of all sub-pixels in the fingerprint identification region 2 can satisfy: $0.25 \leq K \leq 0.5$.

In other embodiments of the present disclosure, the number of brightness-enhancement sub-pixels 4 included in the brightness-enhancement sub-pixel unit 5 can be set in other way, as long as at least a part of the brightness-enhancement sub-pixels 4 is located within the fingerprint identification region 2.

With this arrangement, the brightness-enhancement sub-pixels 4 are regularly arranged in the display area 1. This can improve the service life of the display sub-pixels 3 in the fingerprint identification region 2 while improving the fingerprint recognition detection accuracy, thereby decreasing the process complexity and resulting in the better applicability.

With further reference to FIG. 6, when arranging the brightness-enhancement sub-pixel unit 5, the number of the display sub-pixel unit(s) 6 arranged between any two adjacent brightness-enhancement sub-pixel units 5 may have a same value. The brightness-enhancement sub-pixels 4 do not emit light in the non-fingerprint recognition mode, the number of the display sub-pixel unit(s) 6 arranged between any two adjacent brightness-enhancement sub-pixel units 5 can be the same, that is, the brightness-enhancement sub-pixel units 5 can be evenly distributed in the display area 1, thereby avoiding aggregation of multiple brightness-enhancement sub-pixel units 5 and further reducing the influence of the brightness-enhancement sub-pixels 4 on the normal display.

It should be noted that it is merely illustrative in FIG. 6 that only one display sub-pixel unit 6 is arranged between two adjacent brightness-enhancement sub-pixel units 5. In other embodiments of the present disclosure, a different number of display sub-pixel units 6 may be arranged between two adjacent brightness-enhancement sub-pixel units 5, which will not be limited by the present disclosure.

In an implementation, with further reference to FIG. 6, a length L1 of the brightness-enhancement sub-pixel 4 in the first direction is equal to a length L2 of the display sub-pixel 3 in the first direction, and a length L3 of the brightness-enhancement sub-pixel 4 in the second direction is equal to a length L4 of the display sub-pixel 3 in the second direction. With this arrangement, the brightness-enhancement sub-pixel 4 has a same size as the display sub-pixel 3, so that the process complexity of forming the brightness-enhancement sub-pixel 4 can be decreased.

Figure 8:
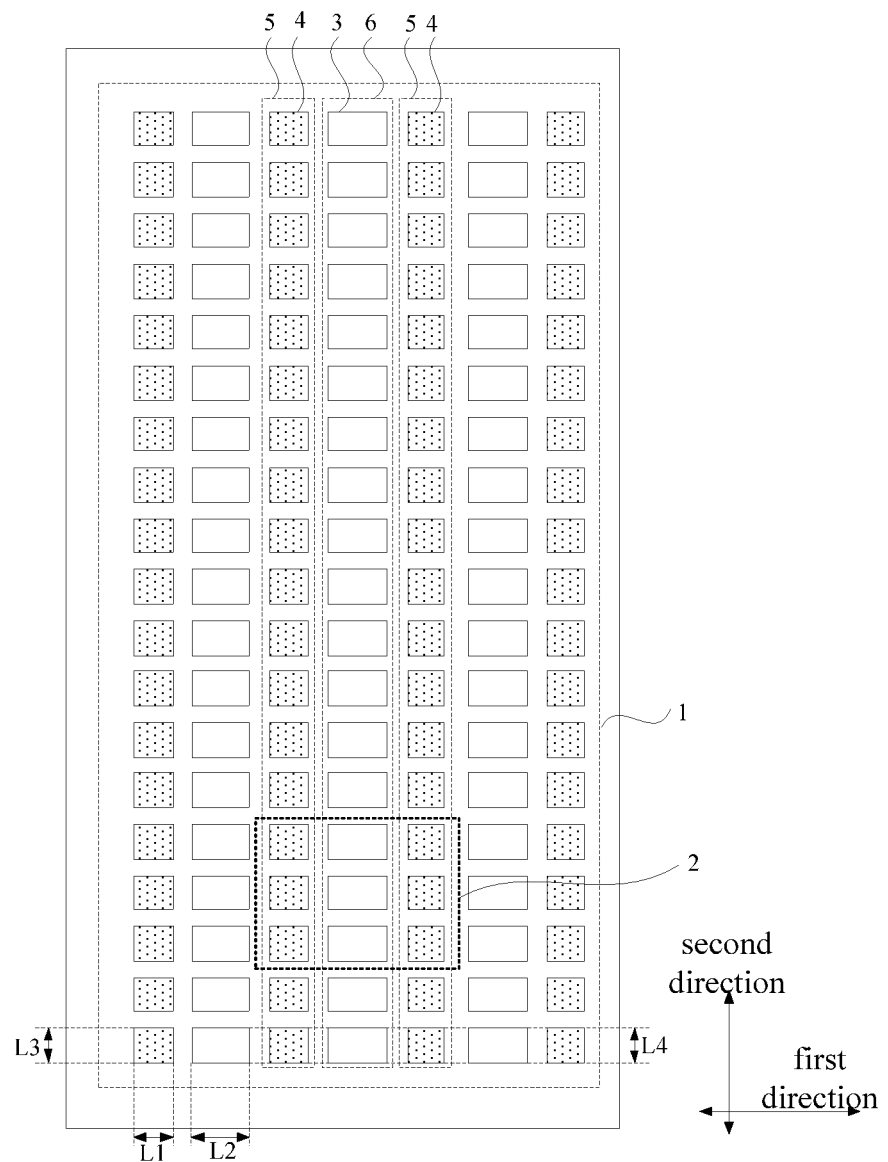
FIG. 8 is a schematic diagram of still another arrangement of brightness-enhancement sub-pixels and display sub-pixels according to an embodiment of the present disclosure.

In an implementation, as shown in FIG. 8, which is still another schematic diagram of an arrangement of brightness-enhancement sub-pixels and display sub-pixels according to an embodiment of the present disclosure, the length L1 of the brightness-enhancement sub-pixel 4 in the first direction is smaller than the length L2 of the display sub-pixel 3 in the first direction, and the length L3 of the brightness-enhancement sub-pixel 4 in the second direction is equal to the length L4 of the display sub-pixel 3 in the second direction. Since the brightness-enhancement sub-pixels 4 do not emit light in the non-fingerprint recognition mode, the occupation proportion of each brightness-enhancement sub-pixel 4 in the display area 1 can be decreased by making the size of the brightness-enhancement sub-pixel 4 to be smaller than the size of the display sub-pixel 3, and thus the influence of the brightness-enhancement sub-pixel 4 on the normal display can be reduced.

It should be noted that in other embodiments of the present disclosure, the plurality of brightness-enhancement sub-pixels 4 included in each brightness-enhancement sub-pixel unit 5 and the plurality of display sub-pixels 3 included in each display sub-pixel unit 6 can be also arranged along the first direction. In this case, the dimensional relationship between the brightness-enhancement sub-pixel 4 and the display sub-pixel 3 may be the same as the dimensional relationship between the brightness-enhancement sub-pixel 4 and the display sub-pixel 3 in the above embodiments, which will not be repeated herein.

Figure 9:
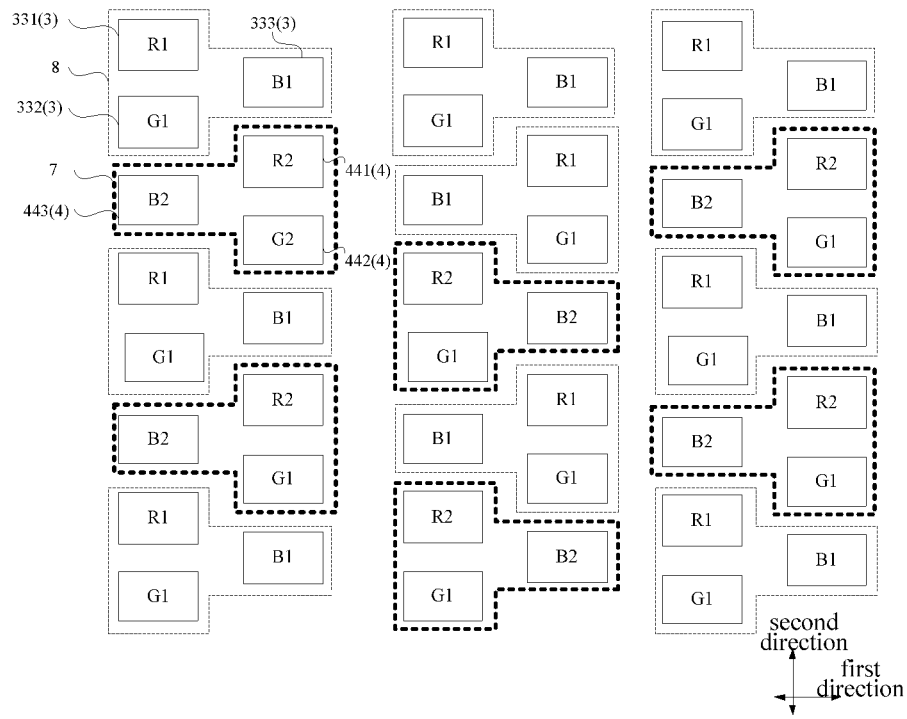
FIG. 9 is a schematic diagram of still another arrangement of brightness-enhancement sub-pixels and display sub-pixels according to an embodiment of the present disclosure.

In an implementation, as shown in FIG. 9, which is a schematic diagram of still another arrangement of brightness-enhancement sub-pixels and display sub-pixels according to an embodiment of the present disclosure, the plurality of brightness-enhancement sub-pixels 4 includes a red brightness-enhancement sub-pixel 441 (R2), a green brightness-enhancement sub-pixel 442 (G2) and a blue brightness-enhancement sub-pixel 443 (B2). Here, one red brightness-enhancement sub-pixel 441 (R2), one green brightness-enhancement sub-pixel 442 (G2) and one blue brightness-enhancement sub-pixel 443 (B2) constitute one brightness-enhancement pixel unit 7. The plurality of display sub-pixels 3 includes a red display sub-pixel 331 (R1), a green display sub-pixel 332 (G1), and a blue display sub-pixel 333 (B1). Here, one red display sub-pixel 331 (R1), one green display sub-pixel 332 (G1) and one blue display sub-pixel 333 (B1) constitute one display pixel unit 8.

In the fingerprint identification region 2, a plurality of brightness-enhancement units 7 and a plurality of display pixel units 8 are arranged in a matrix. For the brightness-enhancement pixel units 7 located in a same row, at least one display pixel unit 8 is arranged between two adjacent brightness-enhancement pixel units 7. For the brightness-enhancement pixel units 7 located in a same column, at least one display pixel unit 8 is arranged between two adjacent brightness-enhancement pixel units 7.

With this arrangement, on the one hand, the plurality of brightness-enhancement pixel units 7 formed by brightness-enhancement sub-pixels 4 are dispersedly distributed in display area 1, avoiding aggregation of the brightness-enhancement pixel units 7 and reducing the influence of the brightness-enhancement pixels units 7 on the normal display of the display panel. On the other hand, in the plurality of sub-pixels, when only partial color sub-pixels are taken as brightness-enhancement sub-pixels 4, for example, when a part of the red sub-pixels and a part of the blue sub-pixels are taken as brightness-enhancement sub-pixels 4, in the non-fingerprint recognition mode, during the normal display of the display panel, the number of green sub-pixels serving as display sub-pixels 3 would be larger than the number of red sub-pixels serving as display sub-pixels 3 and the number of blue sub-pixels serving as display sub-pixels 3. Since the light brightness of the green sub-pixels will be high, this would affect the chromaticity of the display image. In the above embodiments, each brightness-enhancement pixel unit 7 includes one red brightness-enhancement sub-pixel 441, one green brightness-enhancement sub-pixel 442, and one blue brightness-enhancement sub-pixel 443. In this way, the number of red sub-pixels serving as display sub-pixels 3, the number of blue sub-pixels serving as display sub-pixels 3, and the number of green sub-pixels serving as display sub-pixels 3 can be the same, thereby avoiding the influence on chromaticity.

It should be noted that it is merely illustrative in FIG. 9 for the arrangement of the red brightness-enhancement sub-pixel 441, the green brightness-enhancement sub-pixel 442, and the blue brightness-enhancement sub-pixel 443 in the brightness-enhancement pixel unit 7 as well as the arrangement of the red display sub-pixel 331, the green display sub-pixel 332, and the blue display sub-pixel 333 in the display pixel unit 8. In practical applications, the brightness-enhancement sub-pixels 4 and the display sub-pixels 3 may adopt other arrangements. For example, for each brightness-enhancement pixel unit 7, the red brightness-enhancement sub-pixel 441, the green brightness-enhancement sub-pixel 442, and the blue brightness-enhancement sub-pixel 443 can be arranged along a row direction, or along a column direction.

Further, for brightness-enhancement pixel units 7 located in a same row, the number of display pixel units 8 arranged between any two adjacent brightness-enhancement pixel units 7 may have a same value. For brightness-enhancement pixel units 7 located in a same column, the number of display pixel units 8 arranged between any two adjacent brightness-enhancement pixel units 7 may have a same value. If the brightness-enhancement pixel units 7 are evenly dispersedly distributed in display area 1, the influence of the brightness-enhancement sub-pixels 4 on the normal display can be reduced.

The brightness-enhancement sub-pixel 4 and the display sub-pixel 3 each include an aperture region. Taking the display sub-pixel 3 as an example, the first light emission component 31 of the display sub-pixel 3 includes an anode, a light emission layer, and a cathode. The region corresponding to the anode is a light outgoing region, i.e., the aperture region, of the display sub-pixel 3.

Figure 10:
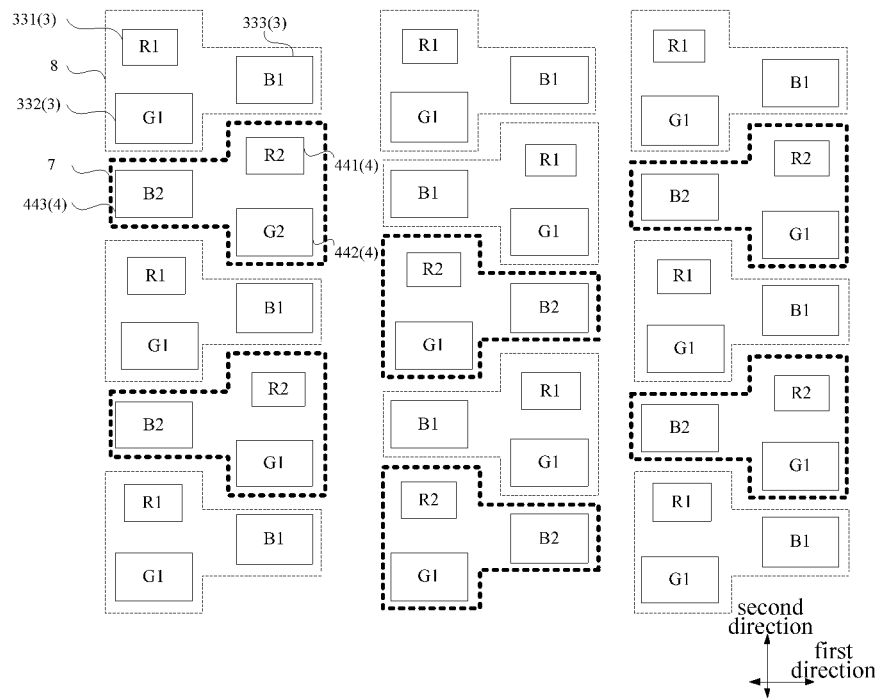
FIG. 10 is a schematic diagram of aperture regions of display sub-pixels and brightness-enhancement sub-pixels according to an embodiment of the present disclosure.

As shown in FIG. 10, which is a schematic diagram of aperture regions of display sub-pixels and brightness-enhancement sub-pixels according to an embodiment of the present disclosure, the aperture region of the red brightness-enhancement sub-pixel 441 has an area of S1, the aperture region of the green brightness-enhancement sub-pixel 442 has an area of S2, and the aperture region of the blue brightness-enhancement sub-pixel 443 has an area of S3, where $S1<S3\leq S2$. The aperture region of the red display sub-pixel has an area of S4, the aperture region of the green display sub-pixel 332 has an area of S5, and the aperture region of the blue display sub-pixel 333 has an area of S6, where $S4<S6\leq S5$.

For example, for display sub-pixels 3, since the service life of the blue display sub-pixel 333 and the green display sub-pixel 332 is shorter than that of the red display sub-pixel 331, the area of the aperture region of the blue display sub-pixel 333 and the area of the aperture region of the green display sub-pixel 332 can be set to be larger, so that the current density of the blue display sub-pixel 333 and the green display sub-pixel 332 may decrease and thus the blue display sub-pixel 333 and the green display sub-pixel 332 may attenuate more slowly, thereby allowing sub-pixels with the three different colors to have the similar service life. The same case is applicable to the brightness-enhancement sub-pixel 3, which will not be repeated herein.

The present disclosure further provides a method for driving a display panel, and the method is applicable to the abovementioned display panel.

Figure 11:
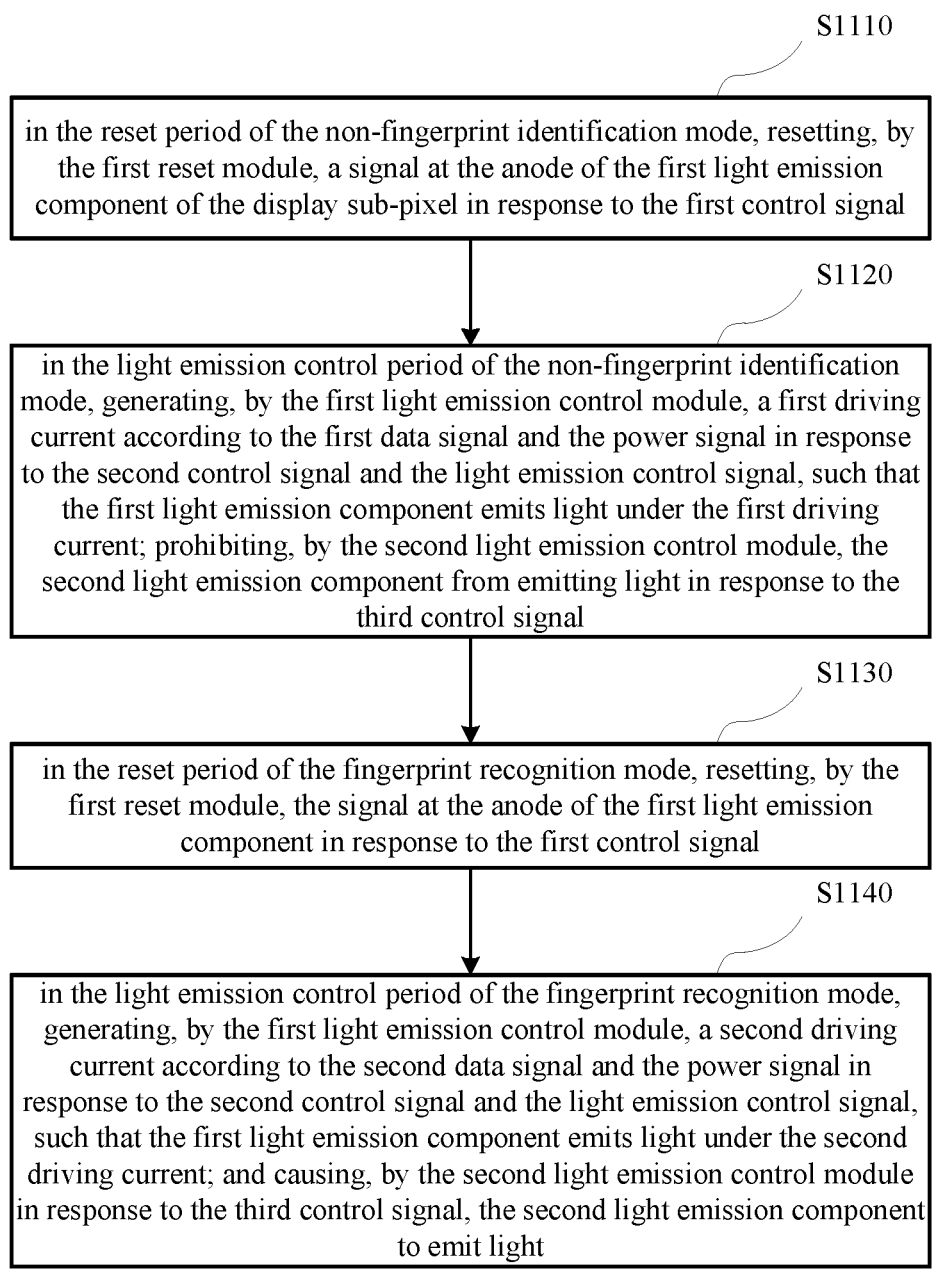
FIG. 11 is a flowchart of a method for driving a display panel according to an embodiment of the present disclosure.

The operating modes of the display panel include a non-fingerprint recognition mode and a fingerprint recognition mode. In both the non-fingerprint recognition mode and the fingerprint recognition mode, the display panel has a driving cycle including a reset period and a light emission control period. With reference to FIG. 2 and FIG. 11, the method for driving the display panel includes the following steps.

At step S1110, in the non-fingerprint identification mode, in the reset period, the first reset module 32 resets a signal at an anode of the first light emission component 31 of the display sub-pixel 3 in response to the first control signal.

At step S1120, in the light emission driving period of the non-fingerprint identification mode, the first light emission control module 33 generates a first driving current according to the first data signal and the power signal in response to the second control signal and the light emission control signal, so that the first light emission component 31 emits light under the first driving current. The second light emission control module 42 prohibits, in response to the third control signal, the second light emission component 41 from emitting light under the second driving current.

At step S1130, in the fingerprint recognition mode, in the reset period, the first reset module 32 resets a signal at the anode of the first light emission component 31 in response to the first control signal.

At step S1140, in the light emission driving period of the fingerprint recognition mode, the first light emission control module 33 generates a second driving current according to the second data signal and the power signal in response to the second control signal and the light emission control signal, so that the first light emission component 31 emits light under the second driving current. The second light emission control module 42 causes, in response to the third control signal, the second light emission component 41 to emit light under the second driving current.

With the method for driving the display panel provided by the embodiments of the present disclosure, when the display panel is in the fingerprint recognition mode, the second light emission control module 42 of the brightness-enhancement sub-pixel 4 operates under the third control signal, such that the second light emission component 41 and the first light emission component 31 share the driving current in the fingerprint recognition mode and emit light under their respective driving current. Compared with the related art in which that the brightness required for the fingerprint recognition is achieved only by the light emission of the display sub-pixel 3, this embodiment of the present disclosure uses the brightness-enhancement sub-pixel 4 and the display sub-pixel 3 to share the brightness required for the fingerprint recognition, thereby improving the overall brightness in the fingerprint identification region 2. That is, this can decrease the light brightness of the display sub-pixel 3 in the fingerprint identification region 2 in the fingerprint identification process while improving the fingerprint recognition detection accuracy, thereby improving the service life of these sub-pixels 3 and effectively improving the brightness uniformity of the image displayed on the display panel.

The structures and driving principles of the first reset module 32, the first light emission control module 33, and the second light emission control module 42 have been described in the above embodiments, and will not be repeated herein.

In combination with FIG. 5, when the brightness-enhancement sub-pixel 4 further includes a second reset module 43 and the second reset module 43 is electrically connected to the reset signal terminal Vref, the first control signal terminal S1, and the anode of the second light emission component 41, in the reset period of the fingerprint recognition mode, the method for driving the display panel further includes resetting, by the second reset module 43 in response to the first control signal, a signal at the anode of the second light emission component 41. By resetting the anode of the second light emission component 41, the potential of the anode of the second light emission component 41 can be restored to an initial potential, so as to achieve normal light emission of the second light emission component 41 in the subsequent light emission control period.

Corresponding to the first manner in the above embodiments, the second light emission control module 42 of the brightness-enhancement sub-pixel 4 is electrically connected to the anode of the first light emission component 31 of the display sub-pixel 3 in the fingerprint identification region 2. For the display sub-pixel 3 and the brightness-enhancement sub-pixel 4 that are connected to each other, when the color of the light emitted from the brightness-enhancement sub-pixel 4 is the same as the color of the light emitted from the display sub-pixel 3, the voltage value of the second data signal is larger than the voltage value of the first data signal.

Corresponding to the second manner in the above embodiments, the second light emission control module 42 of the brightness-enhancement sub-pixel 4 is electrically connected to the anode of the first light emission component 31 of the display sub-pixel 3 in the fingerprint identification region 2. For the display sub-pixel 3 and the brightness-enhancement sub-pixel 4 that are connected to each other, when the color of the light emitted from the display sub-pixel 3 is a first color, the color of the light emitted from the brightness-enhancement sub-pixel 4 is a second color, and the second color has a greater contribution to the brightness than the first color, the voltage value of the second data signal may be larger than or equal to or may be smaller than the voltage value of the first data signal.

Figure 12:
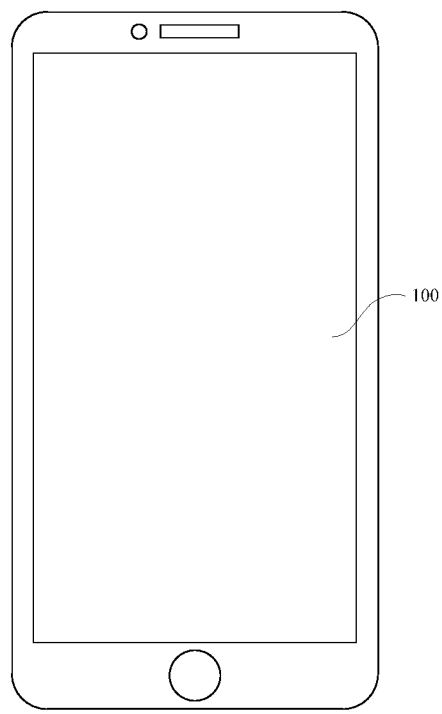
FIG. 12 is a schematic structural diagram of a display device according to an embodiment of the present disclosure.

The present disclosure further provides a display device. As shown in FIG. 12, which is a schematic structural diagram of a display device according to an embodiment of the present disclosure, the display device includes the abovementioned display panel 100. The structure of the display panel 100 and the driving method thereof have been described in detail in the above embodiments, and will not be repeated herein. The display device shown in FIG. 12 is merely illustrative, and the display device can be any electronic device having a display function, such as a cellphone, a tablet computer, a notebook computer, an electronic paper book, a television, etc.

The display device provided by the present disclosure includes the abovementioned display panel, therefore, the use of the display device can increase the service life of display sub-pixel located in the fingerprint identification region while improving the fingerprint recognition detection accuracy, thereby improving the brightness uniformity of the image displayed on the display panel.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A display panel, comprising a plurality of display sub-pixels and a plurality of brightness-enhancement sub-pixels arranged in a display area, wherein the display area comprises a fingerprint identification region, and at least one of the plurality of brightness-enhancement sub-pixels is provided in the fingerprint identification region, wherein each of the plurality of display sub-pixels comprises a first light emission component, a first reset module, and a first light emission control module, wherein in each of the plurality of display sub-pixels, the first reset module is electrically connected to a reset signal terminal, a first control signal terminal, and an anode of the first light emission component, and is configured to reset a signal at the anode of the first light emission component in response to a first control signal, wherein in each of the plurality of display sub-pixels, the first light emission control module is electrically connected to a power signal terminal, a data line, a light emission control signal terminal, a second control signal terminal, and the anode of the first light emission component, and is configured to generate, in response to a second control signal and a light emission control signal, a driving current according to a data signal and a power signal, wherein in the at least one of the plurality of brightness-enhancement sub-pixels located in the fingerprint identification region, each of the at least one of the plurality of brightness-enhancement sub-pixels comprises a second light emission component and a second light emission control module, wherein the second light emission control module of each of the at least one of the plurality of brightness-enhancement sub-pixels is electrically connected to the anode of the first light emission component of a respective one of the plurality of display sub-pixels, wherein the second light emission control module of each of the at least one of the plurality of brightness-enhancement sub-pixels is also electrically connected to a third control signal terminal and an anode of the second light emission component, and is configured to, in a fingerprint recognition mode, cause the second light emission component to emit light under the driving current generated by the first light emission control module, in response to a third control signal.

2. The display panel according to claim 1, wherein the second light emission control module comprises a first thin film transistor, and wherein the first thin film transistor has a control electrode electrically connected to the third control signal terminal, a first electrode electrically connected to the anode of the first light emission component, and a second electrode electrically connected to the anode of the second light emission component.

3. The display panel according to claim 1, wherein each of the at least one of the plurality of brightness-enhancement sub-pixels further comprises a second reset module, and wherein the second reset module is electrically connected to the reset signal terminal, the first control signal terminal and the anode of the second light emission component, and is configured to reset a signal at the anode of the second light emission component in response to the first control signal.

4. The display panel according to claim 3, wherein the second reset module comprises a second thin film transistor, and
wherein the second thin film transistor has a control electrode electrically connected to the first control signal terminal, a first electrode electrically connected to the reset signal terminal, and a second electrode electrically connected to the anode of the second light emission component.

5. The display panel according to claim 1, wherein the second light emission control module of each brightness-enhancement sub-pixel of the at least one of the plurality of brightness-enhancement sub-pixels is electrically connected to the anode of the first light emission component of an adjacent display sub-pixel.

6. The display panel according to claim 1, wherein the second light emission control module of each of the at least one of the plurality of brightness-enhancement sub-pixels is electrically connected to the anode of the first light emission component of a respective one display sub-pixel in the fingerprint identification region, and
wherein for each brightness-enhancement sub-pixel of the at least one of the plurality of brightness-enhancement sub-pixels and the display sub-pixel connected to the brightness-enhancement sub-pixel, light emitted from the brightness-enhancement sub-pixel has a same color as light emitted from the display sub-pixel.

7. The display panel according to claim 1, wherein the second light emission control module of each of the at least one of the plurality of brightness-enhancement sub-pixels is electrically connected to the anode of the first light emission component of a respective one display sub-pixel in the fingerprint identification region, and
wherein for each of the at least one of the plurality of brightness-enhancement sub-pixels and a display sub-pixel connected to the brightness-enhancement sub-pixel, light emitted from the display sub-pixel has a first color, light emitted from the brightness-enhancement sub-pixel has a second color, and a contribution value of the second color to brightness is greater than a contribution value of the first color to brightness.

8. The display panel according to claim 1, wherein the display area further comprises a non-fingerprint identification region, the second light emission control module of each of the at least one of the plurality of brightness-enhancement sub-pixels is electrically connected to the anode of the first light emission component of a respective one display sub-pixel located in the non-fingerprint identification region.

9. The display panel according to claim 1, wherein the display panel comprises a plurality of brightness-enhancement sub-pixel units and a plurality of display sub-pixel units, wherein each of the plurality of brightness-enhancement sub-pixel units comprises multiple brightness-enhancement sub-pixels arranged along a second direction, and each of the plurality of display sub-pixel units comprises multiple display sub-pixels arranged along the second direction, and
wherein at least one of the plurality of display sub-pixel units is arranged between any two adjacent brightness-enhancement sub-pixel units of the plurality of brightness-enhancement sub-pixel units.

10. The display panel according to claim 9, wherein a number of the at least one display sub-pixel units arranged between any two adjacent brightness-enhancement sub-pixel units of the plurality of brightness-enhancement sub-pixel units has a same value.

11. The display panel according to claim 9, wherein a length of each brightness-enhancement sub-pixel in a first direction is smaller than or equal to a length of each display sub-pixel in the first direction, and a length of each brightness-enhancement sub-pixel in the second direction is equal to a length of each display sub-pixel in the second direction.

12. The display panel according to claim 1, wherein the plurality of brightness-enhancement sub-pixels comprises at least one red brightness-enhancement sub-pixel, at least one green brightness-enhancement sub-pixel, and at least one blue brightness-enhancement sub-pixel, wherein one of the at least one red brightness-enhancement sub-pixel, one of the at least one green brightness-enhancement sub-pixel, and one of the at least one blue brightness-enhancement sub-pixel constitute one brightness-enhancement pixel unit,
wherein the plurality of display sub-pixels comprise at least one red display sub-pixel, at least one green display sub-pixel, and at least one blue display sub-pixel, wherein one of the at least one red display sub-pixel, one of the at least one green display sub-pixel, and one of the at least one blue display sub-pixel constitute one display pixel unit, and
wherein a plurality of brightness-enhancement pixel units and a plurality of the display pixel units are arranged in a matrix in the fingerprint identification region; wherein at least one display pixel unit of the plurality of display pixel units is arranged between any two adjacent brightness-enhancement pixel units of the plurality of brightness-enhancement sub-pixel units located in a same row; and wherein at least one display pixel unit of the plurality of display pixel units is arranged between any two adjacent brightness-enhancement pixel units of the plurality of brightness-enhancement sub-pixel units located in a same column.

13. The display panel according to claim 12, wherein a number of the at least one display pixel unit arranged between any two adjacent brightness-enhancement pixel units of the plurality of brightness-enhancement pixel units located in the same row has a same value, and a number of the at least one display pixel unit arranged between any two adjacent brightness-enhancement pixel units of the plurality of brightness-enhancement pixel units located in a same column has a same value.

14. The display panel according to claim 12, wherein each brightness-enhancement sub-pixel of the plurality of brightness-enhancement sub-pixels comprises an aperture region, and each display sub-pixel of the plurality of display sub-pixels comprises an aperture region,
wherein the aperture region of the at least one red brightness-enhancement sub-pixel has an area of S1, the aperture region of the at least one green brightness-enhancement sub-pixel has an area of S2, and the aperture region of the at least one blue brightness-enhancement sub-pixel has an area of S3, where S1<S3≤S2, and
wherein the aperture region of the at least one red display sub-pixel has an area of S4, the aperture region of the at least one green display sub-pixel has an area of S5, and the aperture region of the at least one blue display sub-pixel has an area of S6, where S4<S6≤S5.

15. A method for driving a display panel, the method being applicable to the display panel according to claim 1, wherein the display panel has an operating mode comprising a non-fingerprint recognition mode and a fingerprint recognition mode, and in both the non-fingerprint recognition mode and the fingerprint recognition mode, a driving cycle of the display panel comprises a reset period and a light emission control period, and wherein the method for driving the display panel comprises:

in the reset period of the non-fingerprint identification mode, resetting, by the first reset module, a signal at the anode of the first light emission component of the display sub-pixel in response to the first control signal;

in the light emission control period of the non-fingerprint identification mode, generating, by the first light emission control module, a first driving current according to the first data signal and the power signal in response to the second control signal and the light emission control signal, such that the first light emission component emits light under the first driving current; prohibiting, by the second light emission control module, the second light emission component from emitting light in response to the third control signal;

in the reset period of the fingerprint recognition mode, resetting, by the first reset module, the signal at the anode of the first light emission component in response to the first control signal; and in the light emission control period of the fingerprint recognition mode, generating, by the first light emission control module, a second driving current according to the second data signal and the power signal in response to the second control signal and the light emission control signal, such that the first light emission component emits light under the second driving current; and causing, by the second light emission control module in response to the third control signal, the second light emission component to emit light.

16. The method for driving the display panel according to claim 15, wherein each brightness-enhancement sub-pixel of the at least one of the plurality of brightness-enhancement sub-pixels further comprises a second reset module electrically connected to the reset signal terminal, the first control signal terminal and the anode of the second light emission component, and wherein in the reset period of the fingerprint recognition mode, the method for driving the display panel further comprises a step of: resetting, by the second reset module, the signal at the anode of the second light emission component in response to the first control signal.

17. The method for driving the display panel according to claim 15, wherein the second light emission control module of each of the at least one of the plurality of brightness-enhancement sub-pixels is electrically connected to the anode of the first light emission component of a respective one display sub-pixel of the plurality of display sub-pixels in the fingerprint identification region; and for each brightness-enhancement sub-pixel of the at least one of the plurality of brightness-enhancement sub-pixels and a display sub-pixel connected to the brightness-enhancement sub-pixel, light emitted from the brightness-enhancement sub-pixel has a same color as light emitted from the display sub-pixel, and wherein the second data signal has a voltage value larger than a voltage value of the first data signal.

18. The method for driving the display panel according to claim 15, wherein the second light emission control module of each of the at least one of the plurality of brightness-enhancement sub-pixels is electrically connected to the anode of the first light emission component of a respective one display sub-pixel of the plurality of display sub-pixels in the fingerprint identification region, and wherein for each brightness-enhancement sub-pixel of the at least one of the plurality of brightness-enhancement sub-pixels and a display sub-pixel connected to the brightness-enhancement sub-pixel, light emitted from the display sub-pixel has a first color, light emitted from the brightness-enhancement sub-pixel has a second color, and a contribution value of the second color to brightness is greater than the contribution value of the first color to brightness.

19. A display device, comprising a display panel, wherein the display panel comprises a plurality of display sub-pixels and a plurality of brightness-enhancement sub-pixels arranged in a display area, wherein the display area comprises a fingerprint identification region, and at least one of the plurality of brightness-enhancement sub-pixels is provided in the fingerprint identification region, wherein each of the plurality of display sub-pixels comprises a first light emission component, a first reset module, and a first light emission control module, wherein in each of the plurality of display sub-pixels, the first reset module is electrically connected to a reset signal terminal, a first control signal terminal, and an anode of the first light emission component, and is configured to reset a signal at the anode of the first light emission component in response to a first control signal, wherein in each of the plurality of display sub-pixels, the first light emission control module is electrically connected to a power signal terminal, a data line, a light emission control signal terminal, a second control signal terminal, and the anode of the first light emission component, and is configured to generate, in response to a second control signal and a light emission control signal, a driving current according to a data signal and a power signal, and wherein in the at least one of the plurality of brightness-enhancement sub-pixels located in the fingerprint identification region, each of the at least one of the plurality of brightness-enhancement sub-pixels comprises a second light emission component and a second light emission control module, wherein the second light emission control module of each of the at least one of the plurality of brightness-enhancement sub-pixels is electrically connected to the anode of the first light emission component of a respective one of the plurality of display sub-pixels, wherein the second light emission control module of each of the at least one of the plurality of brightness-enhancement sub-pixels is also electrically connected to a third control signal terminal and an anode of the second light emission component, and is configured to, in a fingerprint recognition mode, cause the second light emission component to emit light under the driving current generated by the first light emission control module, in response to a third control signal.

20. The display device according to claim 19, wherein each of the at least one of the plurality of brightness-enhancement sub-pixels further comprises a second reset module, wherein the second reset module is electrically connected to the reset signal terminal, the first control signal terminal and the anode of the second light emission component, and is configured to reset a signal at the anode of the second light emission component in response to the first control signal, wherein the second reset module comprises a second thin film transistor, and wherein the second thin film transistor has a control electrode electrically connected to the first control signal terminal, a first electrode electrically connected to the reset signal terminal, and a second electrode electrically connected to the anode of the second light emission component.

\* \* \* \* \*